Aug. 19, 1958  L. FULLHART, JR., ET AL  2,848,331
GROWTH PROMOTING COMPOSITIONS AND THEIR PREPARATION
Filed Nov. 18, 1954  2 Sheets-Sheet 1
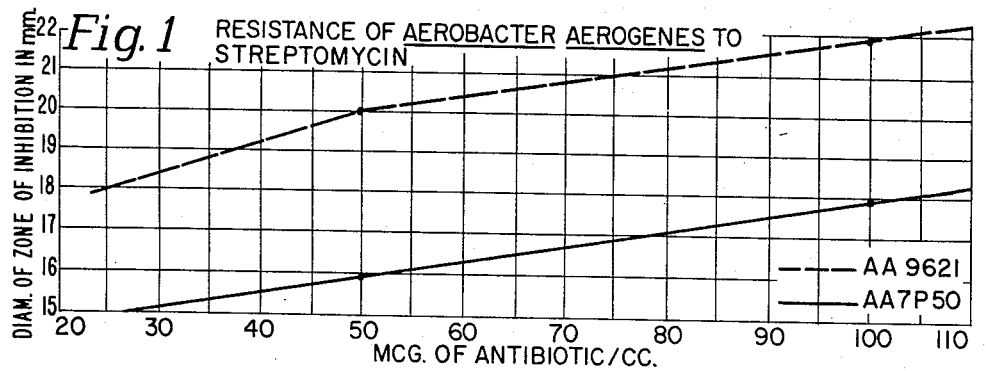
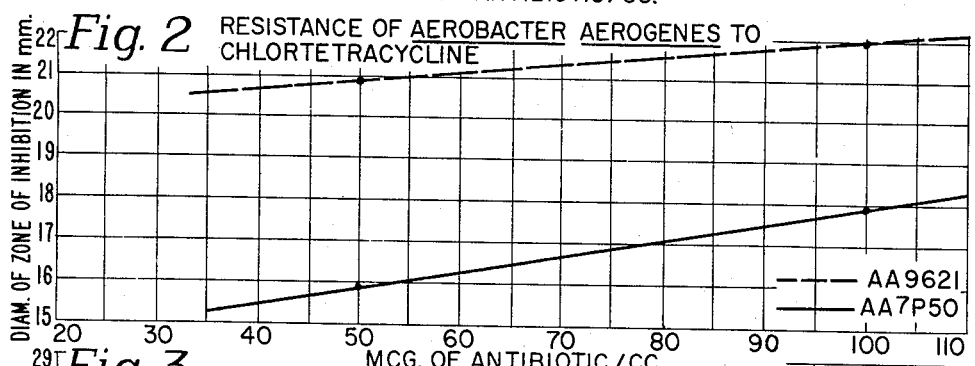
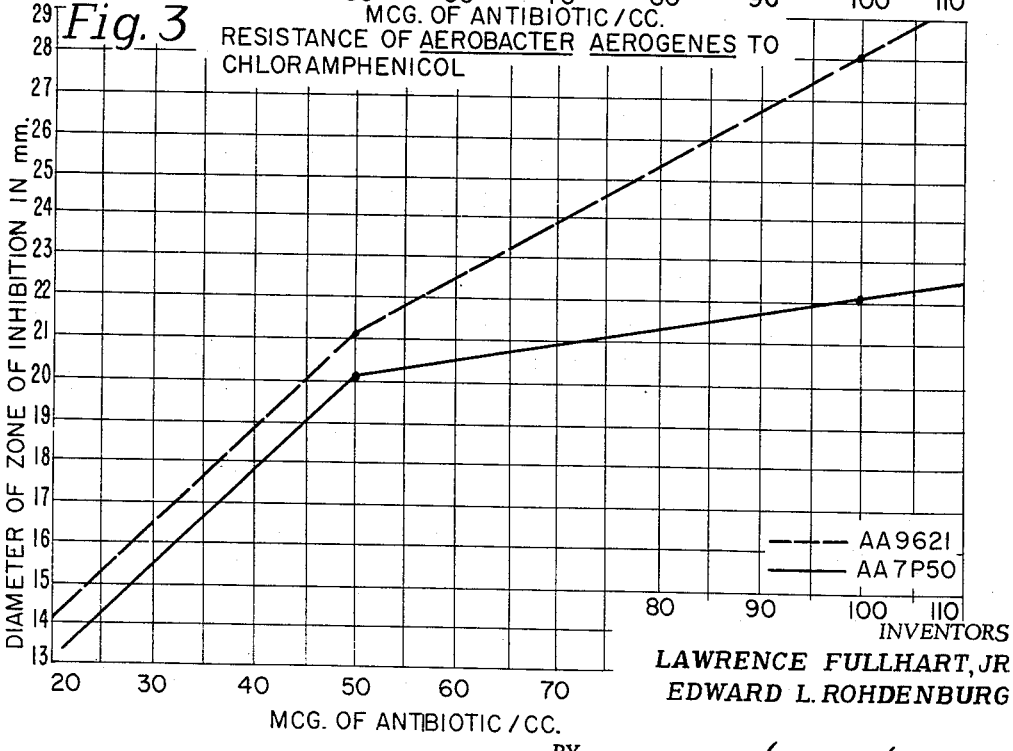
INVENTORS
LAWRENCE FULLHART, JR
EDWARD L. ROHDENBURG
BY
C. Harold Herr
ATTORNEY

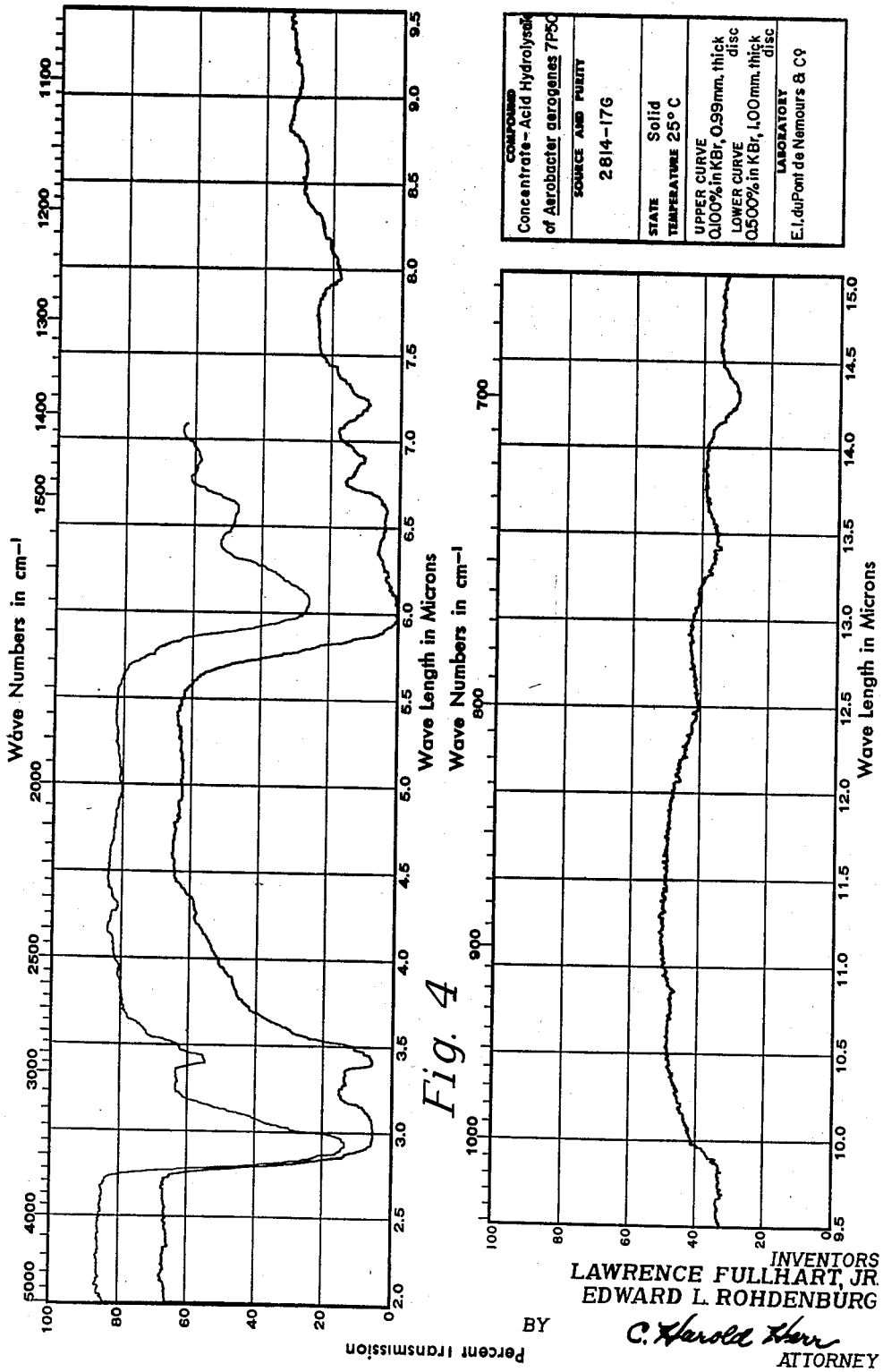

United States Patent Office 2,848,331
Patented Aug. 19, 1958

2,848,331

GROWTH PROMOTING COMPOSITIONS AND THEIR PREPARATION

Lawrence Fullhart, Jr., Newark, and Edward L. Rohdenburg, Metuchen, N. J., assignors to E. I. du Pont de Nemours and Company, Wilmington, Del., a corporation of Delaware Application November 18, 1954, Serial No. 469,756

7 Claims. (Cl. 99—4)

This invention relates to novel growth-promoting compositions, to animal growth-factors contained therein, to their production and isolation, and to feeds containing them. More particularly, the invention is directed to a growth-promoting composition obtained by fermenting an aqueous nutrient liquor with a strain of Aerobacter aerogenes isolated from the ceca of penicillin-fed chicks.

This application is a continuation-in-part of our copending application, Serial No. 371,586, filed July 31, 1953.

In recent years it has been found that inclusion of an antibiotic or a combination of antibiotics, either in crude or pure form, in the ration of young chicks, turkey poults, swine and other animals results in improved growth or feed efficiency.

We have now discovered a growth-promoting composition which can replace at least in part the known antibiotics in animal rations or enhance the antibiotic response.

Our novel growth-promoting composition is formed during cultivation under controlled conditions of an apparently hitherto undescribed strain of the microorganism Aerobacter aerogenes. The particular strain of Aerobacter aerogenes which produces the new substance of the present invention was isolated from the ceca of chicks receiving procaine penicillin in their diet. It is hereafter referred to as Aerobacter aerogenes 7P50, a culture of which has been deposited in the permanent collection of microorganisms maintained at the Northern Utilization Research and Development Division, Agricultural Research Service, United States Department of Agriculture, Peoria, Illinois, where it has been assigned identification No. NRRL B-1992.

The amount of penicillin, preferably procaine penicillin in view of its higher stability, which was fed to the chicks from the ceca of which Aerobacter aerogenes 7P50 was isolated, averaged about 220 units/100 grams of diet. The procaine penicillin in their ration may vary, however, from about 75 units/100 grams to about 750 units per 100 grams of feed.

The detection and isolation of the particular strain of Aerobacter aerogenes used to produce the new growth-promoting composition of the invention can be accomplished as follows: The cecal contents of chicks, after being fed from one to five weeks on a practical diet containing procaine penicillin, are removed under aseptic conditions and diluted with sterile saline. Serial dilution of the cecal contents is made and added to petri dishes containing aerobic media and concentrations of procaine penicillin varying, say, from 10 to 200 units. Those plates containing about 50 units of procaine penicillin contain many more colonies of bacteria than plates prepared in the same manner from the cecal contents of chicks not receiving procaine penicillin in the diet.

These bacteria are separated by physical methods and sub-cultured until pure strains are obtained. Identification of these cultures, according to the method outlined in Bergey's "Manual of Determinative Bacteriology," shows them to be mainly E. Coli and a novel strain of Aerobacter aerogenes herein numbered 7P50.

Aerobacter aerogenes 7P50 is a gram negative rod having no endospores. It does not develop on inorganic media. It produces acid and gas from glucose broth and reduces nitrates, and, accordingly is of the order of Eubacteriales and the family of Enterobacteriaceae. The bacterium readily ferments lactose with the formation of acid and gas in 24 hours and at a temperature of 37° C. Hence it is assigned to the Tribe Eschericheae.

The production of acetylmethylcarbinol along with its positive methyl red reaction designates it in the genus Aerobacter. The fermentation of glycerol with acid and gas production and the fact that the organism does not liquefy gelatin identifies it as a strain of Aerobacter aerogenes.

The cultural properties of Aerobacter aerogenes 7P50 are given below in tabular form:

| Test or Medium | Result |
|---|---|
| Bacto SIM | Indol ±, non-motile. No $H_2S$. |
| Simmons citrate | Good alkaline growth. |
| Litmus | Acid, coagulation. |
| Acetylmethylcarbinol | Produced. |
| Methyl Red | Not Produced. |
| $CO:H_2$ | 2:1. |

Aerobacter aerogenes 7P50 differs from the known strains of Aerobacter aerogenes in being more resistant to a wide variety of antibiotics, including antibiotics effective against gram-negative organisms such as, for example, chlortetracycline and streptomycin, and those effective against gram-positive organisms, such as procaine penicillin.

The growth of Aerobacter aerogenes 7P50 in the presence of various antibiotics has been determined by preparing nutrient agar plates inoculated with a 2% suspension of 7P50 broth culture. Filter paper discs containing various concentrations of the antibiotics are then placed in the agar and the plates incubated for a period of 24 hours. The area of growth inhibition produced by the antibiotic is then measured.

The effects of streptomycin, chlortetracycline and chloroamphenicol at concentrations of 50 and 100 mcg. per cc., on the growth of Aerobacter aerogenes 7P50 and A. T. C. C. #9621 (a representative commercial strain) are shown in Figures 1, 2 and 3, respectively.

Figure 1 shows the resistance of Aerobacter aerogenes 7P50 to streptomycin. Our strain 7P50 is 4 times resistant to streptomycin as the representative strain of Aerobacter aerogenes 9621.

Figure 2, which shows the resistance of Aerobacter aerogenes 7P50 to chlortetracycline, indicates the strain of Aerobacter aerogenes 7P50 to be more than twice as resistant to chlortetracycline as the representative strain, 9621.

Figure 3 shows the resistance of Aerobacter aerogenes 7P50 to chloroamphenicol. 7P50 is from 1 to 2 times as resistant to chloroamphenicol as the representative strain of Aerobacter aerogenes, 9621.

For the production of the new growth-promoting substance of this invention a pure culture of Aerobacter aerogenes 7P50 is maintained on nutrient agar slants. From such stock, transfers are made to 50–100 ml. lots of sterile Czapek-Dox medium in Erlenmeyer flasks and incubated on a shaker at a temperature of from 27° C. to 30° C. for a period of from 24 to 48 hours to be used as seed.

Czapek-Dox medium, which is a standard nutrient solution, contains per liter the following:

| | G. |
|---|---|
| Sucrose | 30.0 |
| Sodium nitrate | 3.0 |
| Dipotassium phosphate | 1.0 |
| Magnesium sulfate | 0.5 |
| Potassium chloride | 0.5 |
| Ferrous sulfate | 0.01 |

*Aerobacter aerogenes* 7P50 can be grown on any of a variety of protein-free nutrient media to produce the growth-promoting composition of the present invention. There can be used, for instance, a simple salt medium such as the Czapek-Dox medium already described.

In fact, any protein-free nutrient medium can be employed which contains a source of carbon such as a soluble carbohydrate; a source of inorganic nitrogen; and traces of various metals which are usually found as impurities in the other substituents of the fermentation medium.

It will be understood that the amount of cellular growth varies with the medium used and whether or not the broth is aerated. We prefer to use the simple Czapek-Dox medium with aeration.

*Aerobacter aerogenes* 7P50 can be grown in the presence of the strain of *E. coli* isolated from ceca of procaine-penicillin-fed chicks, and can also be grown in the presence of procaine penicillin.

The pH of the fermentation medium at the start can range from about 4.0 to 9.0. Preferably, the pH is on the alkaline side, say, around pH 7.2 to pH 7.4 at the start of the fermentation. This may be obtained by adjustment of the medium, if necessary, with mineral acid or alkali. As the fermentation progresses, the pH of the medium tends first to become acid and then alkaline, ending at about pH 8.4 if the fermentation is prolonged to 6 days.

The preferred temperature of the fermentation process is about 27° to 30° C. Temperatures as low as about 20° C. or as high as about 35° C. may, however, be used.

Maximum yield can be obtained within about 48 hours of fermentation at optimum conditions of temperature and air pressure. But, of course, lower yields may be obtained in a shorter period of time, say, 24 hours, and a longer period, for instance, up to 144 hours, may even be used under some conditions.

In the following example a growth-promoting composition containing at least one novel animal growth factor is prepared. Such a composition is suitable for use as an animal feed supplement.

The fermentation, seeded from the Erlenmeyer culture already described is carried out under controlled conditions in 10–12 liter quantities. The fermentation medium (Czapek-Dox) is maintained at a temperature of 27–30° C., stirred constantly and aerated with about 1 volume of air per volume of mash per minute. Maximum cell growth is attained after a period of about 48 hours. Fermentation is then interrupted.

The beers are immediately centrifuged in a Sharples centrifuge. The bacterial cells are recovered and either stored in a frozen condition or dried under vacuum at a maximum temperature of 50° C. The cells containing the novel growth promoting composition of the invention can be used as feed supplements for poultry and livestock.

The growth factors contained in these *Aerobacter aerogenes* 7P50 cell preparations can be concentrated and isolated, and the resulting concentrates and isolates may be used as feed supplements. More will be said later about the concentrates and their biological activity.

The growth-promoting activity of the bacterial cells themselves on chicks is shown by the following three experiments. In each of them the basic ration referred to hereafter as Basal No. 7A consists of:

| | Percent |
|---|---|
| Yellow corn | 42.93 |
| Solvent extracted SBOM (3 sources) | 20.00 |
| Ground barley | 10.00 |
| Wheat flour middlings | 10.00 |
| Corn gluten meal | 5.00 |
| Pure wheat bran | 5.00 |
| Dehydrated alfalfa meal | 3.00 |
| Calcium phosphate, tribasic | 1.75 |
| Calcium carbonate | 0.75 |
| Iodized salt | 0.50 |
| Feed grade $MnSO_4$ (85%) | 0.02 |
| "Delsterol" (2000 AOAC units D/gm.) | 0.05 |
| Vitamin supplement | 1.00 |
| | 100.00 |

Each gram of the vitamin supplement contains:

| | Mg. |
|---|---|
| Thiamine.HCl | 0.1500 |
| Riboflavin | 1.0000 |
| Pyridoxine.HCl | 0.1350 |
| D-calcium pantothenate | 0.5070 |
| Niacin | 0.5070 |
| Folic acid | 0.0120 |
| Menadione | 0.5000 |
| Choline chloride | 7.7500 |
| Vitamin $B_{12}$ | 0.0011 |

Since this diet—Basal No. 7A—is complete in the known requirements of proteins, carbohydrates, fats, minerals, and vitamins, the additional growth described in detail hereafter that is obtained by feeding the fermentation product of *Aerobacter aerogenes* 7P50 attests to the production and essentiality of the new growth factor.

The chicks used in the tests were day-old cockerels with approximately 15 birds per group.

NUMBER 1

| | Average Wt. in grams at 5 weeks | g. Feed used per g. Wt. gained |
|---|---|---|
| Basal No. 7A | 497 | 2.22 |
| Basal No. 7A+75 mg. *Aerobacter aerogenes* 7P50 cells/100 g. of diet | 557 | 2.12 |
| Basal No. 7A+220 units of procaine penicillin/100 g. of diet | 562 | 2.11 |

NUMBER 2

| | Av. Wt. in grams at 5 weeks | g. Feed used per g. Wt. gained |
|---|---|---|
| Basal No. 7A | 523 | 2.24 |
| Basal No. 7A+75 mg. *Aerobacter aerogenes* 7P50/100 g. of diet | 531 | 2.24 |
| Basal No. 7A+220 units of procaine penicillin/100 g. of diet | 533 | 2.24 |
| Basal No. 7A+220 units of procaine penicillin + 75 mg. of *Aerobacter aerogenes* cells/100 g. of diet | 556 | 2.19 |

NUMBER 3

| | Av. Wt. in grams at 5 weeks | g. Feed used per g. Wt. gained |
|---|---|---|
| Basal No. 7A | 484 | 2.57 |
| Basal No. 7A+*Aerobacter aerogenes* 7P50 cells [1] | 506 | 2.34 |
| Basal No. 7A+220 units of procaine penicillin/100 g. of diet | 498 | 2.46 |

[1] This is an average of three groups receiving 675 mg., 225 mg., and 75 mg., respectively, of *Aerobacter aerogenes* 7P50 cells/100 g. of diet.

In obtaining the biologically active concentrates and isolates previously mentioned, an *Aerobacter aerogenes* 7P50 cell preparation is first hydrolyzed to give a water-soluble preparation of the contents of the 7P50 cells.

This hydrolysis can be effected in 1 N sulfuric acid-autoclaving at a temperature of 120° C. for a period of about one hour. Sonic oscillations (10 kc./sec. for 1 hour) can also be used to break open the 7P50 cells.

The hydrolysates and sonic extract are stimulatory to a variety of bacteria when tested in a nutritionally adequate synthetic medium inoculated with the bacteria. Included among the strains of bacteria tested are:

*Lactobacillus casei* ATCC No. 9595,
*Lactobacillus plantarum* ATCC No. 8014,
*Streptococcus faecalis* ATCC No. 9790, and
*Lactobacillus delbrueckii* ATCC No. 9649.

The bacteria are grown at 37° C. on the complete synthetic medium described by Peters et al., J. B. C. 202, 521 (1953), thymidine being used instead of the reported DNA digest. In the case of *L. delbrueckii*, the same medium is used except it is supplemented with additional histidine as suggested by Peters and Snell, J. Bact. 67, 69 (1954).

It will be understood that the bacterial response, which is related to the biological response in higher living organisms, is not the same with all of the strains tested. The response of a certain strain may also vary with the particular extract employed. However, all hydrolysates and sonic extracts prepared as above described are stimulatory.

As a guide in following the biological activity of the factors obtained from the *Aerobacter aerogenes* 7P50 cells by hydrolytic, extractive and adsorption procedures, we have arbitrarily selected *L. delbrueckii* as the assay organism, an assay range of 10–100 γ being used. For convenience, the microbiological activity present in *Aerobacter aerogenes* cells that stimulates the growth of *L. delbrueckii* is referred to herein as the Aerogenes Stimulatory Factor, Delbrueckii, or simply as ASFD.

The Aerogenes Stimulatory Factor, Delbrueckii is for practical purposes stable against 1 N acid. The ASFD activity is not destroyed when whole 7P50 cells are autoclaved with 1 N sulfuric acid or 1 N hydrochloric acid. Substantially all of the activity is liberated in a period of about 15 minutes. After five hours of autoclaving 60–80% of the activity still remains.

Autoclaving the whole cells with 3 N acid does destroy the activity but slowly. ASFD activity is also destroyed with base. After ½–1 hour of autoclaving whole cells with 3 N sodium hydroxide, substantially all of the ASFD activity is destroyed. Weaker base such as for instance 1 N NaOH also destroys activity but at a reduced rate.

Ashing the whole cells destroys all activity in a period of one hour or less. The ash is completely inactive.

Treatment of an *Aerobacter aerogenes* 7P50 cell hydrolysate with sodium nitrite together with glacial acetic acid destroys all ASFD activity in a period of from 1 to 2 hours.

ASFD activity is totally soluble in water, phenol, and methanol and partially soluble in ethanol and butanol. Solvent mixtures such as for instance water-saturated butanol also are capable of extracting or dissolving most of the activity. Acetone, benzene and chloroform do not extract or dissolve any ASFD activity.

In about one hour boiling water extracts about $\frac{1}{20}$ of the ASFD activity from whole cells.

ASFD activity can be adsorbed on alumina, Magnesol, charcoal, Florisil, silica gel, Superfiltrol, Floridin and on other adsorbents. Elution is readily effected using any of a variety of agents. Water-saturated butanol is a preferred agent.

ASFD activity present in *Aerobacter aerogenes* 7P50 cell hydrolysates readily passes thru a cellophane membrane.

By taking advantage of the adsorption and solubility characteristics of the ASFD activity above mentioned, it has been possible to fractionate the ASFD activity and to obtain a 30–50 fold increase in potency. Two representative purification and isolation procedures follow:

The source material for these procedures has been obtained by hydrolyzing *Aerobacter aerogenes* 7P50 cells with 1 N $H_2SO_4$ (one hour autoclaving at 120° C.). In the process of obtaining the 30–50 fold concentrate whose infrared curve is shown in Figure 4 such source material was used.

Instead of separating the cells from the fermentation liquid and then hydrolyzing the separated cells, the entire culture medium (cells plus liquid) can be hydrolyzed as above. This procedure is a preferred one inasmuch as it eliminates centrifuging the cells. It is to be noted that the *Aerobacter aerogenes* medium, that is, the medium which remains after the cells have been removed is neither active or inhibitory in the *L. delbrueckii* assay.

Procedure 1

Eighty grams of whole, freeze-dried *Aerobacter aerogenes* 7P50 cells are suspended in about 800 ml. of 1 N sulfuric acid and hydrolyzed by autoclaving for a period of 1 hour at a temperature of 120° C.

Sufficient barium hydroxide is added to the cooled hydrolysate to precipitate the excess sulfate as the barium salt. The inert barium sulfate is removed by filtration.

The neutralized hydrolystate is then concentrated to a small volume, in vacuo, and extracted 3–4 times with phenol. The phenol extracts are combined and extracted successively with 0.1 N sodium bicarbonate and 0.1 N hydrochloric acid. The latter procedure removes some inert solids and approximately ⅓ of the original activity.

The phenol residue is dissolved in ether and the latter extracted three times with water. The combined water extracts contain essentially ⅔ of the original activity at a potency of 5–7 (fold purification). The water extracts are freeze-dried.

The freeze-dried material is extracted with methanol. Approximately 90% of the activity can be extracted by this procedure (potency of 10–12).

The activity in the methanol extract is adsorbed on acid washed alumina and is preferentially eluted with water-saturated butanol. An approximate 50 fold increase in overall purification is obtained.

Procedure 2

The entire *Aerobacter aerogenes* culture is hydrolyzed as in Procedure 1. After cooling the hydrolysate, charcoal is used to adsorb the activity. After eluting the activity with an acetone-HCl—$H_2O$ mixture (80:2:18 by volume), the eluate is concentrated in vacuo, neutralized and freeze-dried.

The freeze-dried material is extracted with methanol and the activity in the methanol extract is adsorbed on alumina as in Procedure 1. A 30–50 fold purification results.

Portions of the 30–50 fold concentrate have been chromatographed on paper using a variety of solvent mixtures.

Using the system 40:11:19 butanol:acetic acid:water, a $R_f$ value of 0.90–0.70 is obtained repeatedly. All of the activity appears to reside 2–4 inches from the solvent front, the solvent front being about 14 inches from the origin line.

$R_f$ values of 0.90–0.70 have also been obtained with the system 80:20 n-propanol:water and with the system 50:7 phenol:borate buffer (pH 9.3). Using the system 80:20 pyridine:water, the activity seems to move rapidly in pyridine and is undoubtedly very close to the solvent front.

The $R_f$ value of the concentrate using the organic phase of the system methyl isobutyl ketone saturated with 2% p-toluenesulfonic acid is zero.

It will be understood that while the growth-promoting activity of the novel composition of our invention has been described primarily in connection with the avian species, the invention is not to be so limited. The composition of the invention is useful, for instance, as a food supplement for dogs, cats, swine, cattle, and other livestock. In fact, it is of value for all vertebrates.

We claim:

1. A composition useful as a growth-promoting substance for poultry which comprises the product resulting from the fermentation of an aqueous protein-free nutrient liquor with a strain of *Aerobacter aerogenes* isolated from the cecum of a chick fed procaine penicillin.

2. The product obtained by cultivating a strain of *Aerobacter aerogenes* in an aqueous protein-free nutrient-containing, carbohydrate solution under submerged aerobic conditions until substantial growth-promoting activity is imparted to the fermentation suspension, said strain having been isolated from the cecum of a procaine penicillin-fed chick.

3. A feed containing a composition of claim 1.

4. A feed containing a composition of claim 1 and penicillin.

5. A process for the production of a growth-promoting substance for poultry which comprises growing a culture of a strain of *Aerobacter aerogenes* isolated from the ceca of procaine penicillin-fed chicks in an aqueous medium having a pH between 4.0 and 9.0, and containing a soluble carbohydrate, a source of assimilable inorganic nitrogen and essential mineral salts at temperatures within the range of 20° C. to 35° C. for a period not exceeding 144 hours, whereby the aqueous medium is fermented.

6. A process for the production of a growth-promoting substance for poultry which comprises growing a culture of a strain of *Aerobacter aerogenes* isolated from the ceca of procaine penicillin-fed chicks in an aqueous medium having a pH between 7.2 and 7.4, and containing a soluble carbohydrate, a source of assimilable inorganic nitrogen and essential mineral salts at temperatures within the range of 27° C. to 30° C. for a period of about 48 hours, whereby the aqueous medium is fermented.

7. A concentrate of a poultry growth-factor obtained by fermenting an aqueous, protein-free, nutrient medium with *Aerobacter aerogenes* 7P50 under aerobic condition; hydrolyzing the resulting fermentation suspension containing *Aerobacter aerogenes* 7P50 cells, and concentrating the hydrolysate 30–50 fold; said concentrate having the following characteristic properties: completely soluble in water, phenol and methanol; partially soluble in ethanol and butanol; insoluble in actone, benzene and chloroform; adsorbed by alumina, charcoal and silica gel; passes thru a cellophane membrane; stable in 1 N acid but unstable in 3 N base; stimulatory to *Lactobacillus casei, Lactobacillus plantarum, Lactobacillus delbrueckii, Streptococcus faecalis*; $R_f$ values of 0.90–0.70 in the systems 40:11:19 butanol:acetic acid:water and 80:20 propanol:water; zero in the organic phase of methyl isobutyl ketone saturated with 2% p-toluene-sulfonic acid; and exhibiting characteristic absorption bands in the infrared region of the spectrum as shown in Figure 4.

References Cited in the file of this patent
UNITED STATES PATENTS

| | | |
|---|---|---|
| 2,447,814 | Novak | Aug. 24, 1948 |
| 2,482,505 | Duggar | Sept. 13, 1949 |
| 2,636,823 | Becze | Apr. 28, 1953 |